United States Patent [19]

Caspi et al.

[11] Patent Number: 5,546,385
[45] Date of Patent: Aug. 13, 1996

[54] FLEXIBLE SWITCHING HUB FOR A COMMUNICATION NETWORK

[75] Inventors: Rami Caspi, Haifa, Israel; Robert Galin, Cupertino, Calif.

[73] Assignee: Intel Corporation, Santa Clara, Calif.

[21] Appl. No.: 375,803

[22] Filed: Jan. 19, 1995

[51] Int. Cl.⁶ .................................................. H04L 12/54
[52] U.S. Cl. ..................... 370/58.2; 370/61; 370/60; 370/85.1; 370/85.2; 370/94.3
[58] Field of Search .................... 370/58.1, 58.2, 370/60, 61, 85.1, 85.2, 85.3, 85.13, 94.3

[56] References Cited

U.S. PATENT DOCUMENTS

| | | | |
|---|---|---|---|
| 4,710,916 | 12/1987 | Amstutz et al. | 370/58.1 |
| 4,998,247 | 3/1991 | Irvine-Halliday et al. | 370/94.1 |
| 5,140,585 | 8/1992 | Tomikawa | 370/60.1 |
| 5,469,438 | 11/1995 | Baumert et al. | 370/85.11 |

OTHER PUBLICATIONS

Sakurai et al., "Large Scale Multi-Stage Switching Network with Shared Buffer Memory Switches", IEEE Communications Magazine, Jan. 1991 pp. 90–96.

*Primary Examiner*—Douglas W. Olms
*Assistant Examiner*—Russell W. Blum
*Attorney, Agent, or Firm*—Blakely, Sokoloff, Taylor & Zafman

[57] ABSTRACT

A communication system with switched hub is disclosed including a set of communication ports that transfer inbound and outbound communication frames over corresponding serial communication links. The communication ports determine a destination port for each incoming communication frame and perform interleaved transfers of the incoming communication frames to a set of virtual transmit first-in first-out (FIFO) memories that buffer communication frames for outbound transfer. The mechanism disclosed enables fast and efficient switching of the inbound frames to corresponding outbound ports.

13 Claims, 13 Drawing Sheets

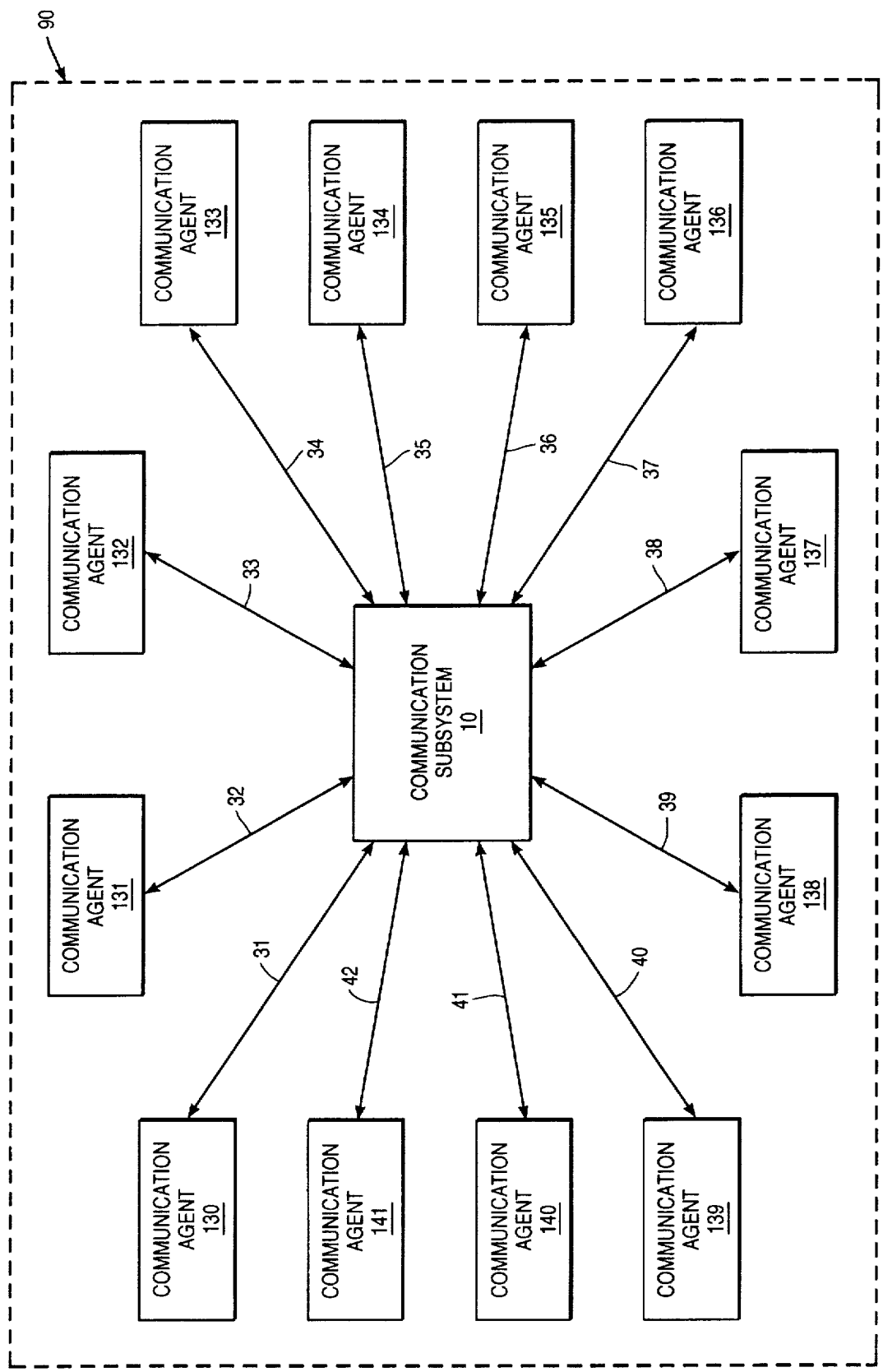
FIG_1

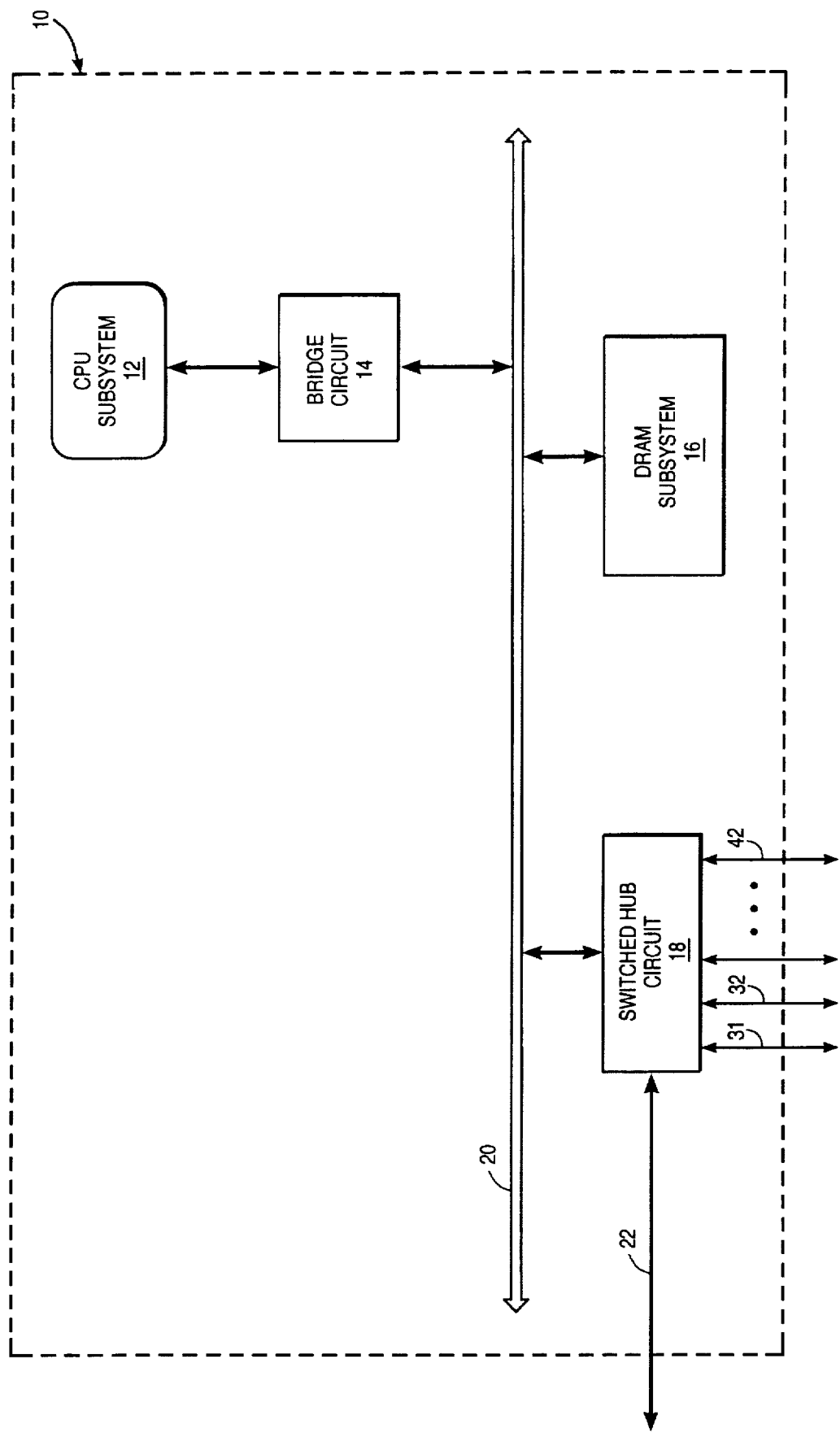

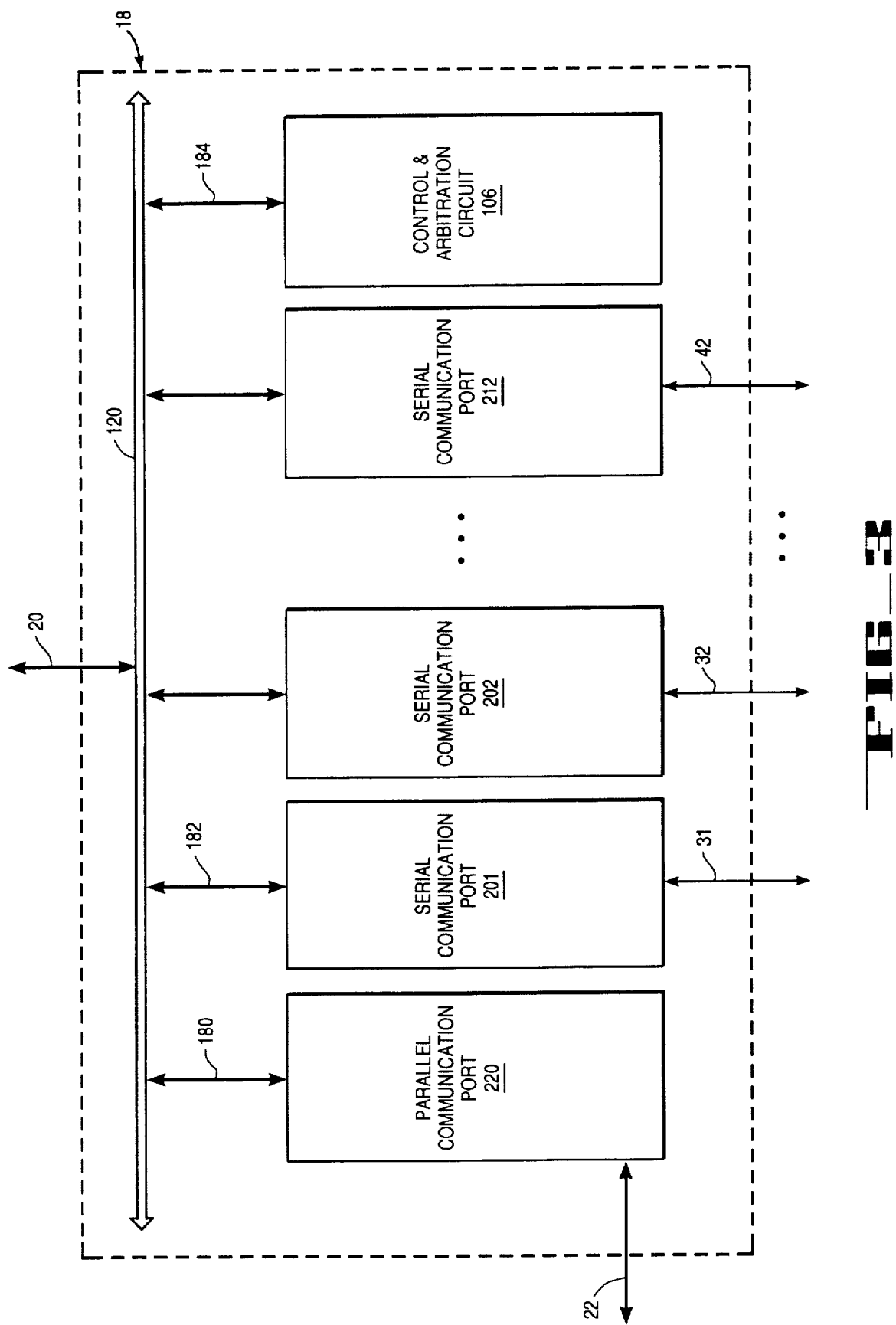
FIG_3

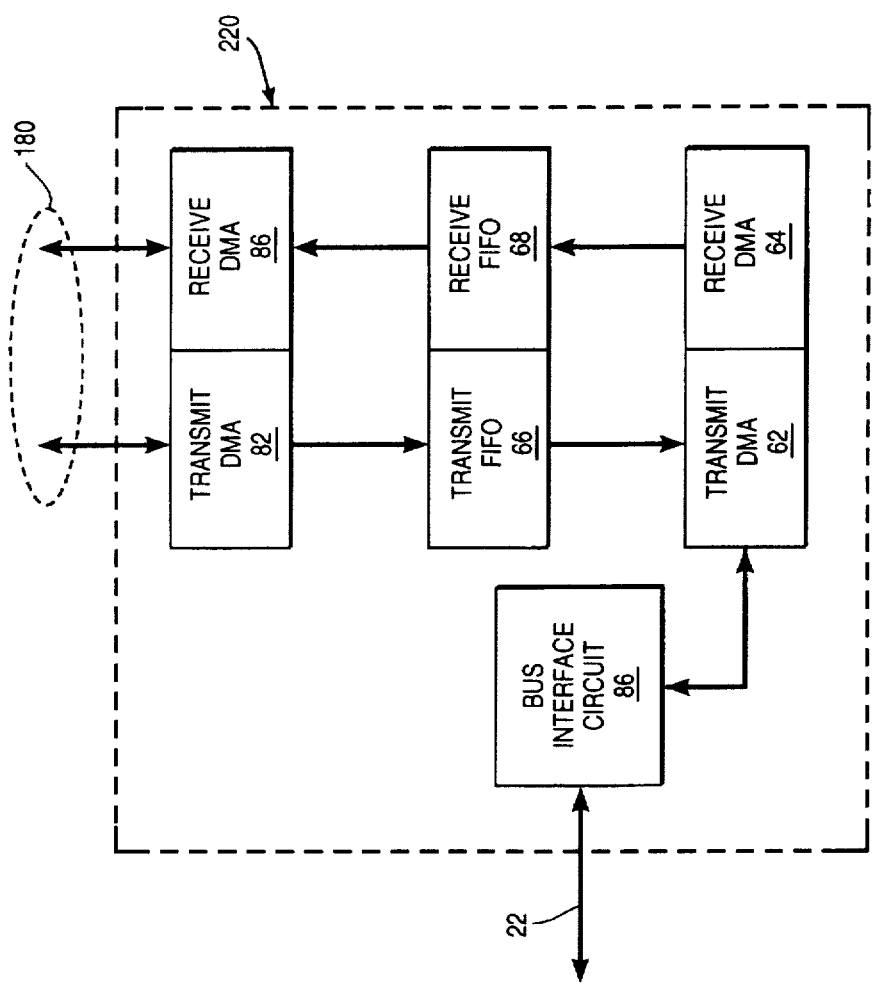
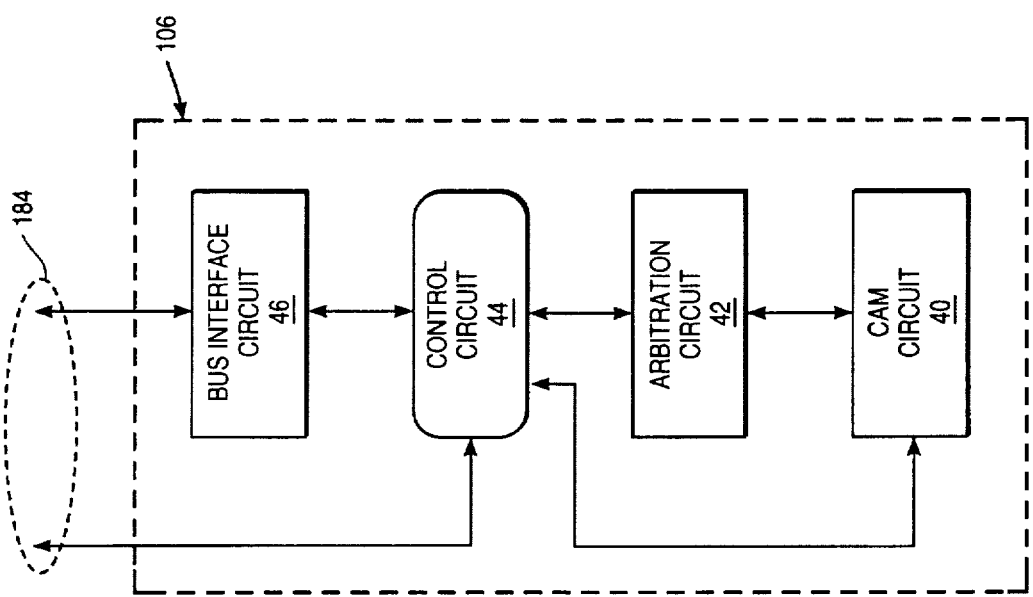

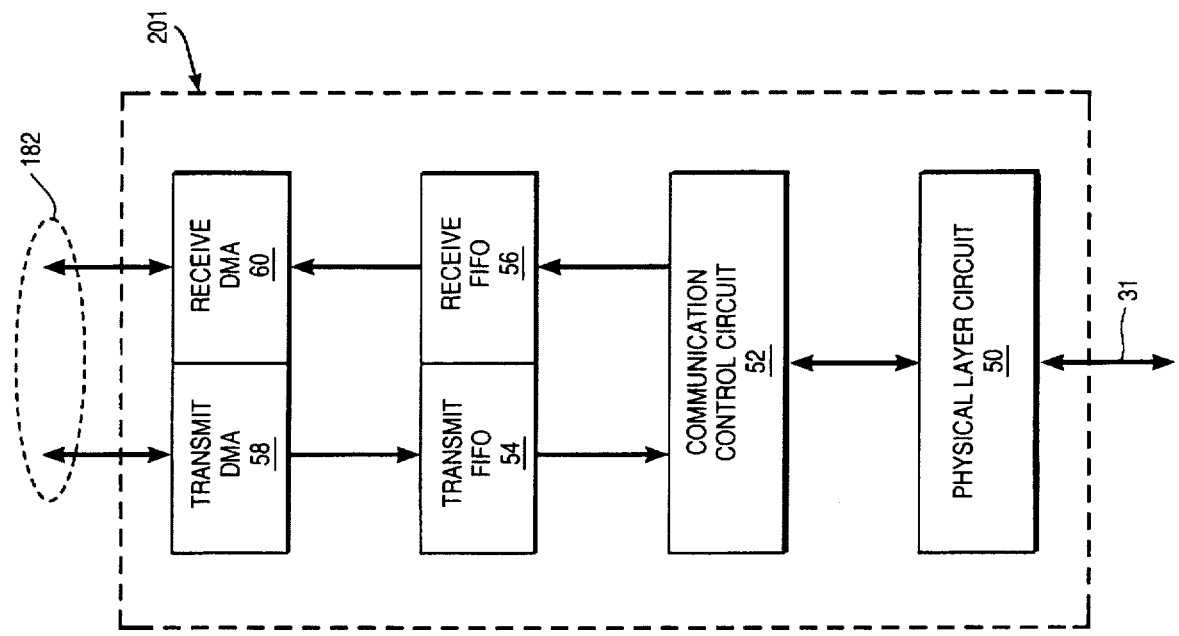
FIG_6

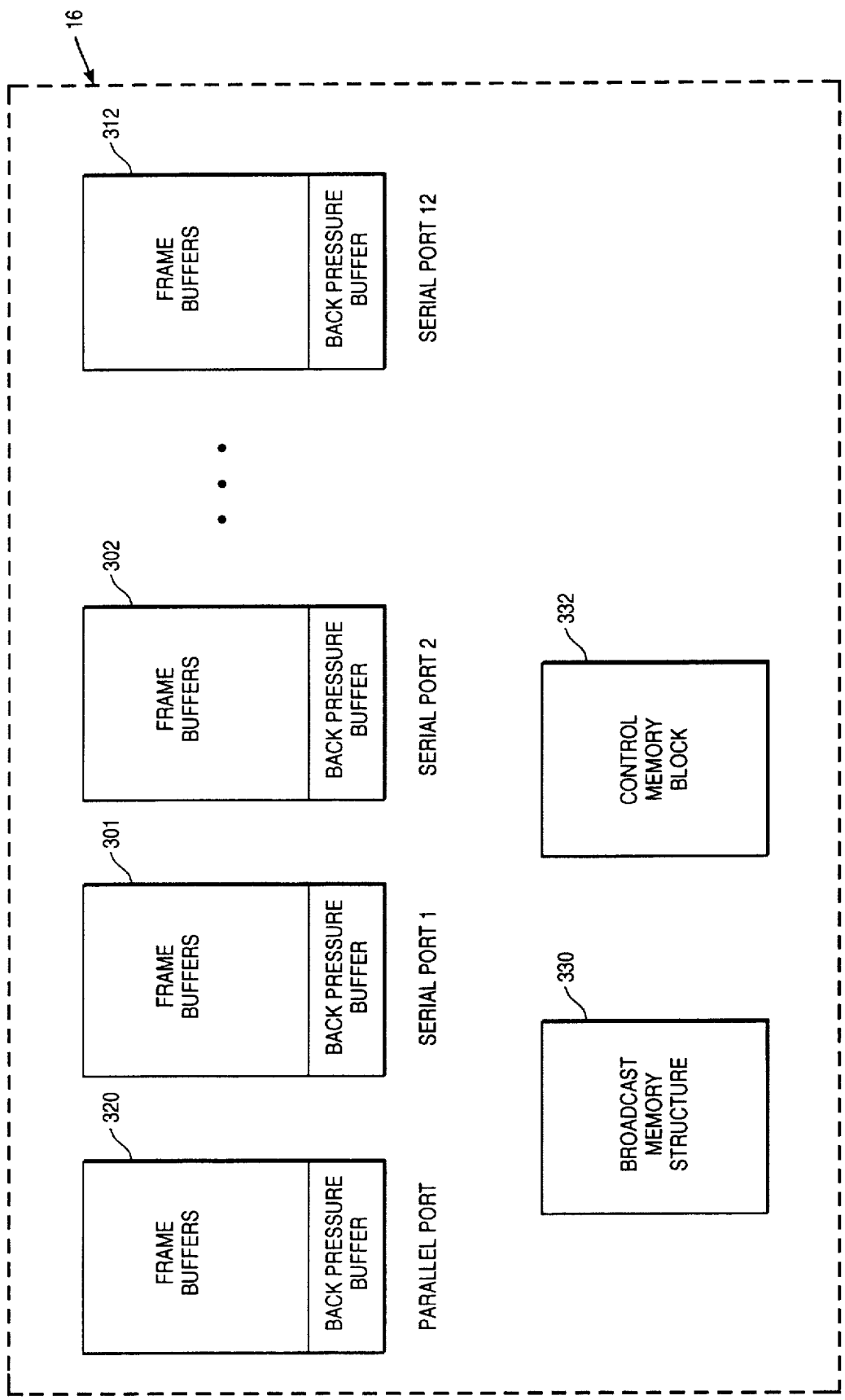
FIG_7A

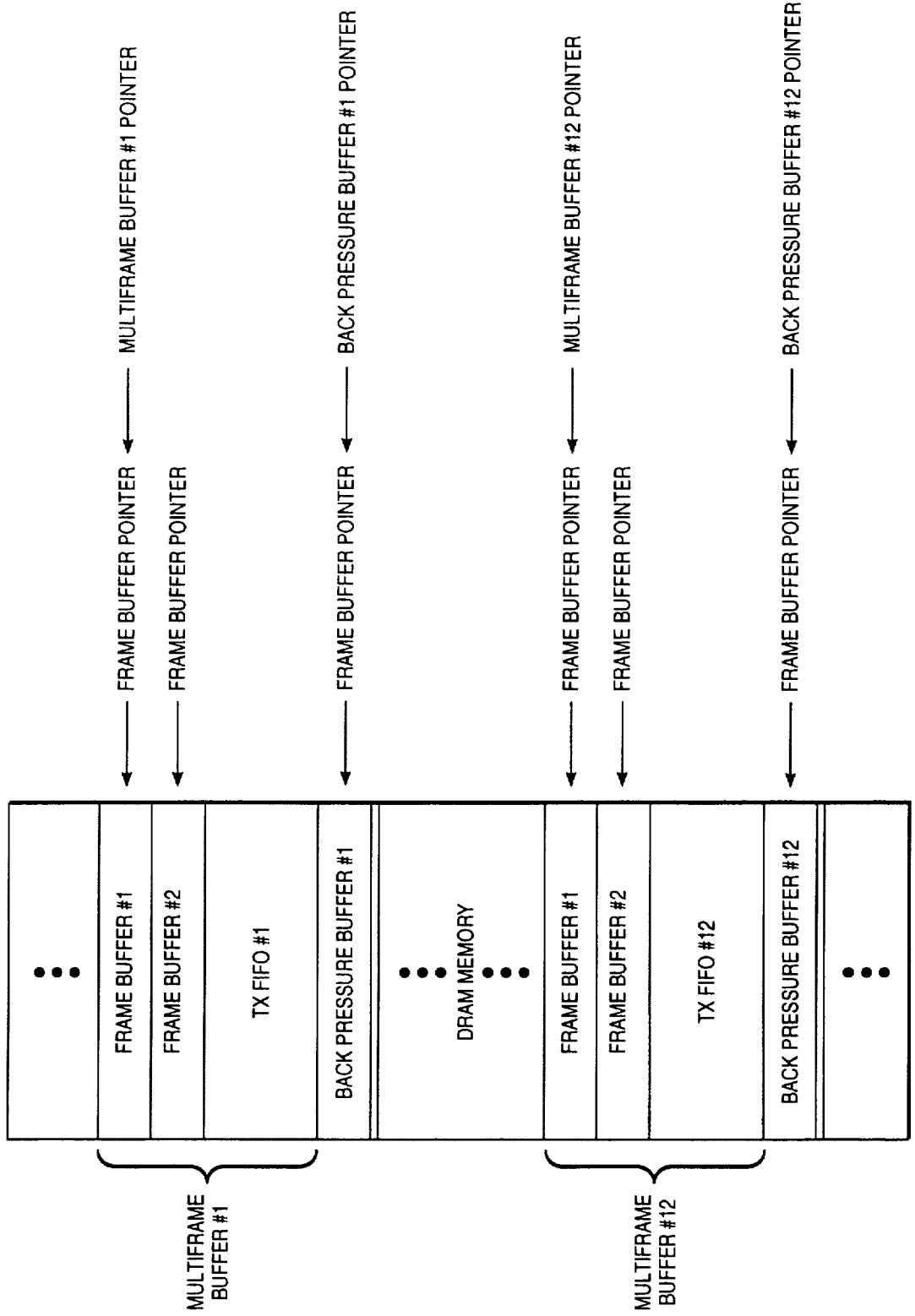
FIG._7B

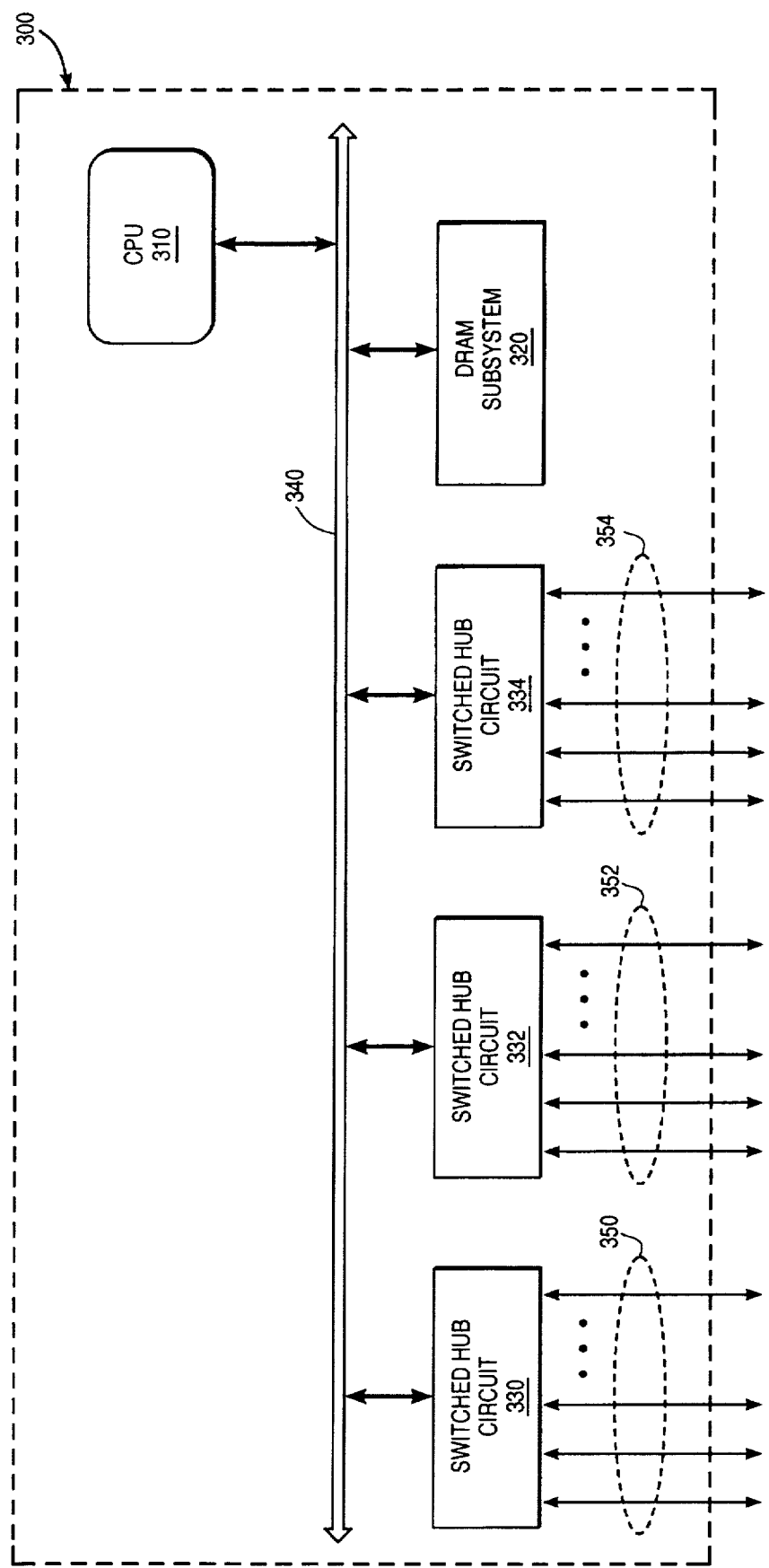

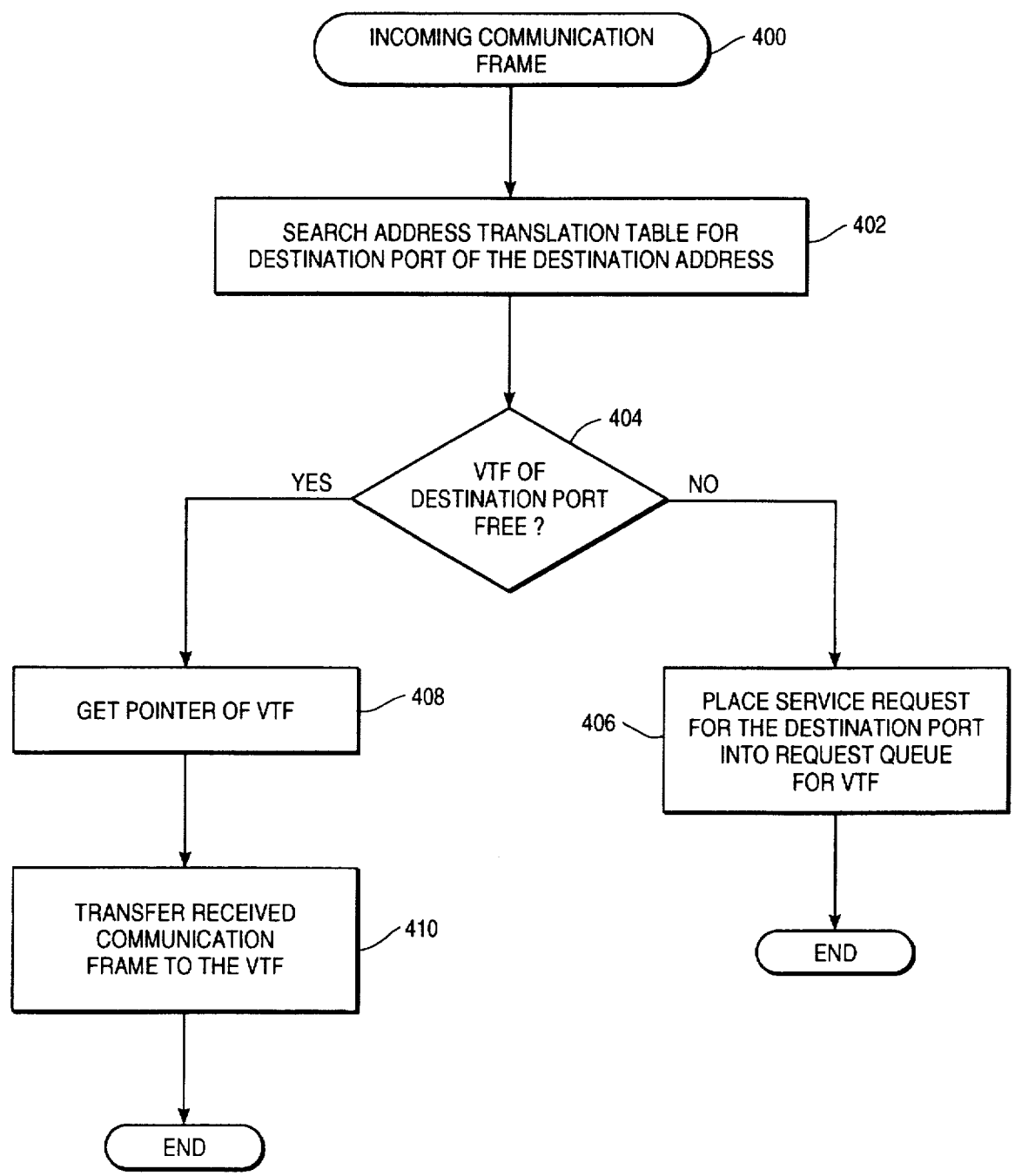
FIG_11

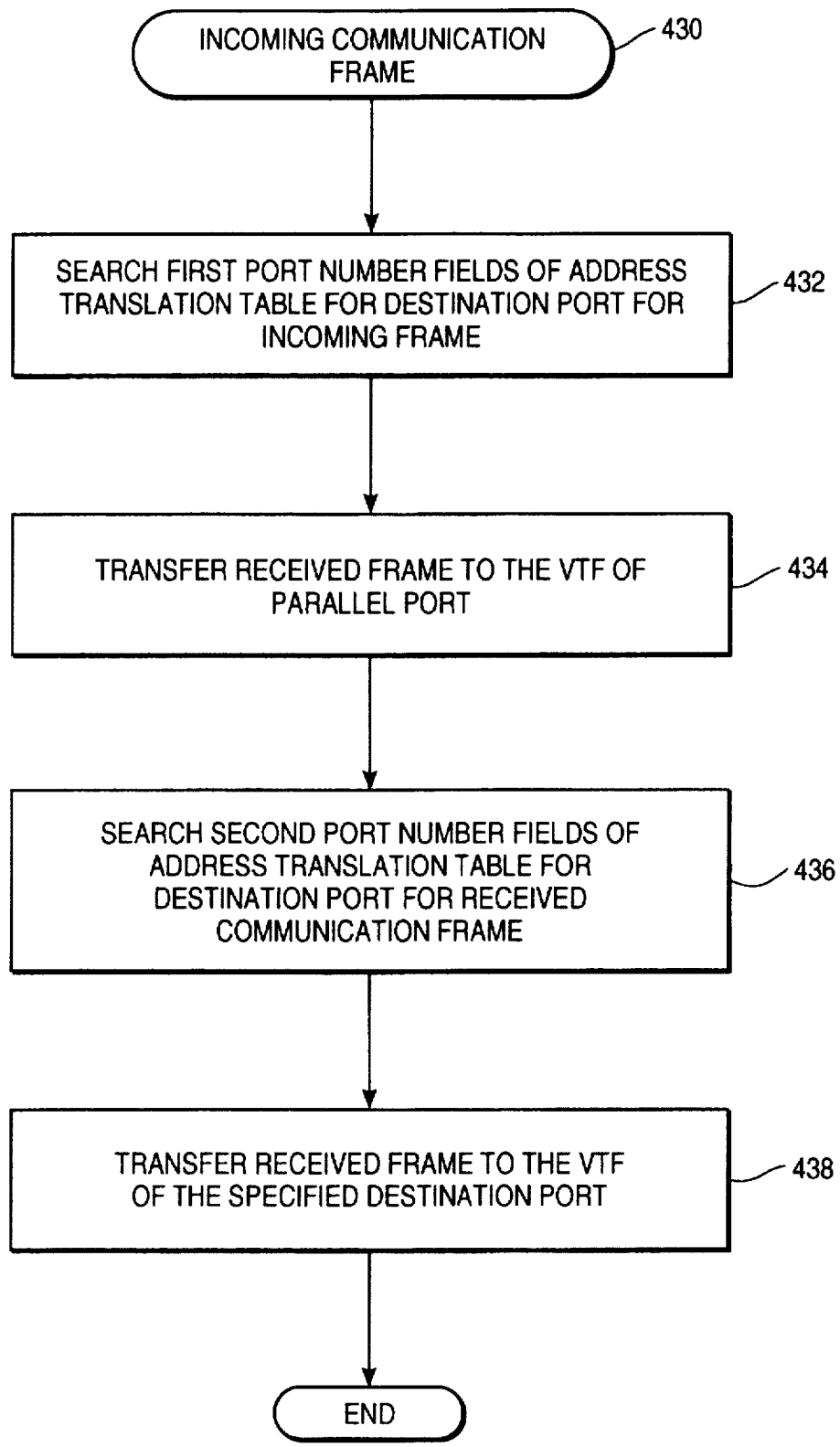
FIG_12

FIG_13

| COMMUNICATION MAC FRAME ADDRESS | FIRST PORT NUMBER FIELD | SECOND PORT NUMBER FIELD | ADDITIONAL DATA |
|---|---|---|---|

5,546,385

FLEXIBLE SWITCHING HUB FOR A COMMUNICATION NETWORK

BACKGROUND OF THE INVENTION

1. Field of the Invention

The present invention pertains to the field of digital communications. More particularly, this invention relates to switching hubs for high speed local area networks.

2. Background

A typical prior local area network is comprised of a set of communication agents coupled to a common communication medium. For example, an Ethernet local area network comprises a set of Ethernet compatible communication agents coupled to a coax cable or a twisted pair cable as a communication medium. In such systems a communication transaction between any two of the communication agents typically prevents communication among the other communication agents during the communication transaction.

One prior method for increasing the capacity of a local area network is to employ bridge circuits. Prior bridge circuits typically couple together segments of local area networks. Typically, each segment comprises a set of communication agents coupled to a communication medium. A bridge circuit enables communication between each of the communication mediums.

Such prior bridge circuits typically listen for communication messages on each of the communication mediums and propagates the appropriate communication messages to the other communication medium according to the network configuration. Communication messages are commonly referred to as communication frames.

Such a prior bridge circuit typically buffers communication frames that require propagation to another communication medium. Thereafter, the bridge circuit forwards the buffered communication frames to the appropriate destination communication agents. Unfortunately, such buffering and forwarding of communication frames between the communication mediums of the local area network increases the overall latency in the communication network.

Another prior method of increasing the capacity of a local area network is to employ a switched hub circuit. A switched hub circuit is typically arranged in a "star" configuration wherein each communication agent in a segment of the local area network couples to a unique serial communication port of the switched hub circuit. The switched hub circuit typically senses incoming communication frames, determines the destinations of the incoming frames, and switches the incoming communication frames to the appropriate outbound transmission paths.

Such switched hub circuits are typically faster than bridge circuits because switched hub circuits do not store and forward the incoming communication frame. Switched hub circuits instead usually start switching the incoming communication frames to the appropriate destinations immediately after determining the destinations of the incoming communication frames according the headers of the incoming communication frames. In addition, such switched hub circuits usually allow parallel data transfer between ports as long as the data transfer paths do not conflict.

Unfortunately, the switching functions performed by such prior switched hub circuits are complicated by certain types of communication traffic. For example, if more than one communication agent attempts to transmit to the same communication agent, the switched hub circuit must select one of the transmissions and delay the other transmissions. The delayed transmissions increase the latency in the network.

In addition, broadcast transmissions and multicast transmissions require a switched hub circuit to switch a single incoming communication frame to multiple destination communication agents even though conflicting traffic may be under way to the destination communication agents. The multicast transmissions typically conflict with other transmissions, thereby increasing delays in the network.

SUMMARY AND OBJECTS OF THE INVENTION

One object of the present invention is to provide a switching hub for a communication network.

Another object of the present invention is to provide a switching hub for a communication network that resolves conflicts among inbound communication frames that specify the same destination, thereby preventing collisions in the network.

Another object of the present invention is to provide a switching hub for a communication network that performs broadcast and multicast operations while avoiding collisions with conflicting communication traffic.

Another object of the present invention is to provide a switching hub for a communication network that enables system expansion through a parallel communication port to other switching hub segments in order to provide scalability.

These and other objects of the invention are provided by a communication system including a switched hub circuit that transfers incoming communication frames via a set of serial communication links. The switched hub circuit stores the incoming communication frames into a set of first-in first-out (FIFO) buffers that supply a set of outbound communication frames for transfer over the serial communication links. The switched hub circuit includes a parallel port for system expansion. The parallel port enables a communication system coupled to the parallel port to access the FIFO buffers.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which:

FIG. 1 illustrates a communication network which comprises a set of communication agents and a communication subsystem;

FIG. 2 illustrates a communication subsystem for one embodiment which comprises a central processing unit, a bridge circuit, a DRAM subsystem, and a switched hub circuit;

FIG. 3 illustrates the switched hub circuit which comprises a set of serial communication ports for communication over the communication links and a parallel communication port for communication to other segments;

FIG. 4 illustrates the control and arbitration circuit for one embodiment which comprises a bus interface circuit, a control circuit, an arbitration circuit and a content addressable memory (CAM) circuit;

FIG. 5 illustrates the parallel communication port for one embodiment which comprises pairs of transmit and receive direct memory access (DMA) circuits, a transmit first in first out (FIFO) memory, and a receive FIFO memory;

FIG. 6 illustrates a serial communication port for one embodiment which includes a physical layer circuit and a communication control circuit;

FIG. 7a is a logical representation of a set of memory structures in the DRAM subsystem including a set of virtual transmit FIFO's (VTFs) that correspond to the serial communication ports;

FIG. 7b is a physical representation the virtual transmit FIFO's (VTFs) that correspond to of the serial communication ports;

FIG. 8 illustrates a communication subsystem which comprises a CPU, a DRAM subsystem, and a set of switched hub circuits all of which communicate over a system interconnect bus and provide serial scalability;

FIG. 11 illustrates the routing schemes one and two wherein a communication frame is routed through same switched hub circuit;

FIG. 12 illustrates routing schemes three and four wherein a communication frame is routed through switched hub circuits on different communication segments;

FIG. 13 illustrates a row of an address translation table for one embodiment.

DETAILED DESCRIPTION

Figure 9:
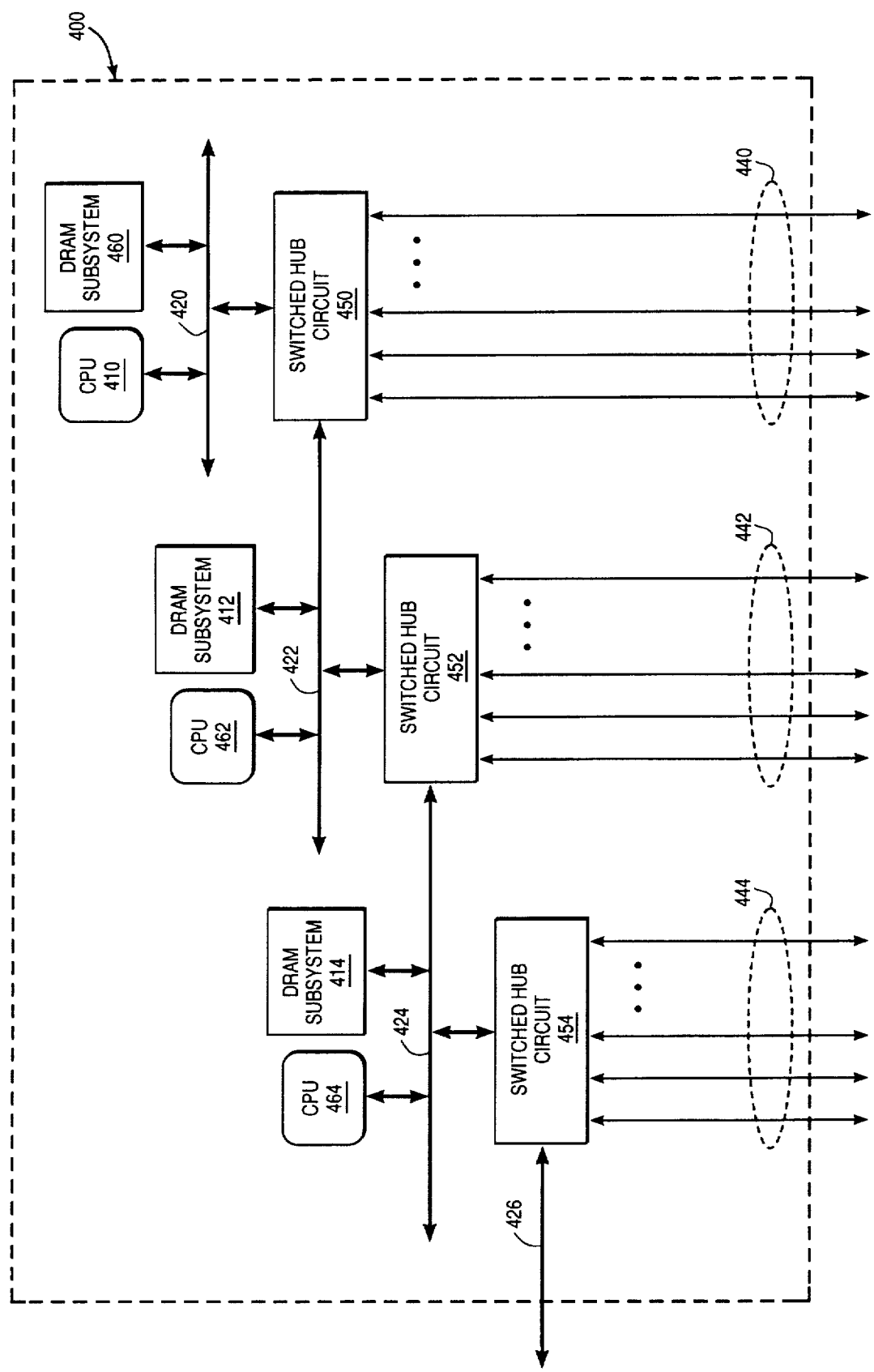
FIG. 9 illustrates a communication subsystem which comprises a set of CPUs, a set of DRAM subsystems, and a set of switched hub circuits that provide both serial and parallel scalability.

FIG. 1 illustrates a communication network 90. The communication network 90 comprises a set of communication agents 130–141 and a communication subsystem 10. The communication agents 130–141 are coupled to the communication subsystem 10 through a set of serial communication links 31–42.

The communication subsystem 10 functions as a switched hub for the communication network 90. The communication subsystem 10 enables communication between pairs of the communication agents 130–141. In addition, the communication subsystem 10 enables concurrent communication between multiple pairs of the communication agents 130–141.

FIG. 2 illustrates the communication subsystem 10 for one embodiment. The communication subsystem 10 comprises a central processing unit (CPU) subsystem 12, a bridge circuit 14, a DRAM subsystem 16, and a switched hub circuit 18. The CPU 12 through the bridge circuit 14, the DRAM subsystem 16, and the switched hub circuit 18 communicate over a system interconnect bus 20. The CPU 12, the DRAM subsystem 16, the switched hub circuit 18 and the system interconnect bus 20 are referred to as a communication segment.

The switched hub circuit 18 contains a set of serial communication ports and a parallel communication port. The serial communication ports of the switched hub circuit 18 are coupled to the serial communication links 31–42. The switched hub circuit 18 enables communication among the communication agents 130–141 over the serial communication links 31–42. The parallel port of the switched hub circuit 18 is coupled to a system interconnect bus 22. The switched hub circuit 18 communicates with other communication segments over the system interconnect bus 22.

FIG. 3 illustrates the switched hub circuit 18 for one embodiment. The switched hub circuit 18 comprises a set of serial communication ports 201–212. The serial communication ports 201–212 enable communication over the communication links 31–42.

The switched hub circuit 18 further comprises a parallel communication port 220 and a control and arbitration circuit 106. The parallel port communication port 220 enables communication to agents on other communication segments coupled to the system interconnect bus 22.

FIG. 4 illustrates the control and arbitration circuit 106 for one embodiment. The control and arbitration circuit 106 comprises a bus interface circuit 46, a control circuit 44, an arbitration circuit 42 and a content addressable memory (CAM) circuit 40.

The CAM circuit 40 contains an address translation table for the switched hub circuit 18. The CAM circuit 40 is organized as a 4 way set associative cache. Each row in the address translation table comprises a serial port number field, a parallel port number field, and a medium attachment controller (MAC) address field.

The bus interface circuit 46 enables the control circuit 44 to perform bus transactions over the system interconnect bus 20. The arbitration circuit 42 performs arbitration functions for accesses over the system interconnect bus 20.

The arbitration circuit 42 controls the access of the DMA circuits of the communication port 201–212 and 220 to a parallel bus 120. The arbitration circuit 42 also handles external requests for access to the parallel bus 120.

The control circuit 44 initializes and manages the DMA channels provided by the DMA circuits of the communication port 201–212 and 220, and also manages the address translation table. For one embodiment, the control circuit 44 is implemented as a micro coded controller.

FIG. 5 illustrates the parallel communication port 220 for one embodiment. The parallel communication port 220 comprises a transmit direct memory access (DMA) circuit 82, a receive DMA circuit 86, a transmit first in first out (FIFO) memory 66, and a receive FIFO memory 68. The transmit DMA circuit 82 performs DMA transfers between the DRAM subsystem 16 and the transmit FIFO memory 66 over the system interconnect bus 20. The receive DMA circuit 86 performs DMA transfers between the receive FIFO memory 68 and the DRAM subsystem 16 over the system interconnect bus 20.

The parallel communication port 220 further comprises a transmit DMA circuit 62, and a receive DMA circuit 64. The transmit DMA circuit 62 performs DMA transfers between the transmit FIFO memory 66 and another DRAM subsystem coupled to the system interconnect bus 22. The receive DMA circuit 64 performs DMA transfers between the DRAM subsystem coupled to the system interconnect bus 22 and the receive FIFO memory 68.

The bus interface circuit 86 enables the transmit DMA circuit 62 and the receive DMA circuit 64 to perform DMA communication transactions over the system interconnect bus 22. The transmit and receive DMA circuits 62 and 64 transfers data in burst transfers over the system interconnect bus 22.

FIG. 6 illustrates the serial communication port 201 for one embodiment. The serial communication port 201 is substantially similar to the serial communication ports 202–212. The serial communication port 201 comprises a physical layer circuit 50 and a communication control circuit 52.

The serial communication port 201 further comprises a transmit FIFO memory 54 and a receive FIFO memory 56, a transmit DMA circuit 58 and a receive DMA circuit 60. The transmit FIFO memory 54 buffers outbound communication frames for transfer over the serial communication link 31. The receive FIFO memory 56 buffers incoming communication frames received over the serial communication link 31.

The receive DMA circuit 60 accesses the received communication frames from the received FIFO memory 56 and transfers the received communication frames over the system interconnect bus 20 to the DRAM subsystem 16. The transmit DMA circuit 58 accesses outbound communication frames from the DRAM subsystem 16 over the system interconnect bus 20. The transmit DMA circuit 58 transfers the outbound communication frames into the transmit FIFO memory 54. The transmit and receive DMA circuits 58 and 60 transfer data in a continuous transactions comprising burst transfers over the system interconnect bus 20 until the transmit FIFO memory 54 is filled, or the receive FIFO memory 56 is emptied, respectively.

The communication control circuit 52 receives inbound communication frames from the serial communication link 31 through the physical layer circuit 50, and transfers the inbound communication frames to the receive FIFO memory 56. The communication control circuit 52 accesses outbound communication frames from the transmit FIFO memory 54, and transmits the outbound communication frames over the serial communication link 31 through the physical layer circuit 50.

The transmit and receive FIFO memories in the switched hub circuit 18 compensate for access latencies to the system interconnect busses 20 and 22. The transmit and receive FIFO memories compensate for delays between access requests to the system interconnect bus 20 and access grants, thereby preventing an underrun/overrun condition. For one embodiment, each transmit and receive FIFO memory contained in the switched hub circuit 18 holds 128 bytes.

The size of the transmit and receive FIFO memories is a function of the bit rate on the communication links 31–42, the bandwidth of the system interconnect bus 20, and the bus request/bus grant latency. The bus request/bus grant latency is also affected by the ratio of the bandwidth of the CPU 12 and the switched hub circuit 18 bandwidth requirements from the system interconnect bus 20. The size of the transmit and receive FIFO memories is defined such that underrun/overrun situations are held below a predefined threshold even in the worst case combinations.

For one embodiment, the physical layer circuit 50 and the communication control circuit 52 enable communication over the serial communication link 31 according to the Ethernet protocol. A token ring serial communication link can also be processed by such an architecture with a few modifications.

FIG. 7a–7b provide a logical and a physical representation of a set of memory structures in the DRAM subsystem 16 for one embodiment. The DRAM subsystem 16 contains a set of virtual transmit FIFOs (VTFs) 301–312. Each VTF 301–312 correspond to one of the serial communication ports 201–212. The DRAM subsystem 16 also contains a VTF 320 that corresponds to the parallel communication port 220. Each VTF 301–312 and 320 comprises a set of frame buffers and a back pressure buffer. Each frame buffer has the capacity to buffer a full length communication frame for the communication network 90, according to the relevant protocol (i.e., Ethernet).

The DRAM subsystem 16 also contains a broadcast memory structure 330. The broadcast memory structure is employed during broadcast operations and multicast operations through the switched hub circuit 18. The DRAM subsystem 16 further comprises a control memory block 332. The control memory block 332 contains a request queue for each VTF 301–312 and 320.

The CPU subsystem 12 contains a cache controller, and an internal memory. The cache controller and the internal memory in the CPU subsystem 12 reduces the bandwidth requirements of the CPU from the system interconnect bus 20 and the bridge circuit 14. The CPU subsystem 12 mainly performs communication management functions for the communication system 10.

For one embodiment, the system interconnect buses 20 and 22 are standardized peripheral component interconnect (PCI) buses for communication among a variety of input/output components such as communication and graphics co-processors. The system interconnect buses 20 and 22 each comprise a 32 bit bus portion that accommodates multiplexed address and data signals and an arbitration mechanism.

The communication agents 130–141 correspond to the VTFs 301–312. The VTFs 301–312 are managed by the internal logic of the switched HUB circuit 18 and by the CPU subsystem 12. The VTFs 301–312 are extensions of the corresponding transmit FIFO memories contained in the serial communication ports 201–212.

Each VTFs 301–312 and 320 comprises a series of frame buffers for buffering communication frames and a back pressure buffer. For one embodiment, each frame buffer includes a data portion that accommodates the maximum Ethernet frame length of 1520 bytes for double word alignment. Each buffered frame includes a control header.

Each serial communication port 201–212 receives incoming communication frames over the corresponding serial communication links 31–42, determines a destination communication port for each incoming communication frame, and transfers the incoming communication frames to the appropriate destination VTFs 301–312 and 320. The order of buffered frames in the VTFs 301–312 and 320 represent the order of arrival of the corresponding communication frames.

The frame buffer at the top of each VTF 301–312 and 320 is transferred to the transmit FIFO memory in the corresponding communication ports 201–212 and 220 by the transmit DMA circuits in the corresponding communication ports 201–212 and 220. Each transmit FIFO memory in the corresponding communication ports 201–212 and 220 is filled in one bus acquisition session using burst transfers over the system interconnect bus 20.

For one embodiment, the physical layer interface circuits in the serial communication ports 201–212 each support TPE and AUI Ethernet interfaces. The communication control circuits in the serial communication ports 201–212 each modify the original Ethernet protocol for the backoff algorithm. The communication control circuits in the serial communication ports 201–212 do not participate in the collision resolution protocol as a fair player, but always draws a zero thereby significantly increasing chances to win the collision resolution process.

The parallel communication port 220 enables communication between the system interconnect buses 20 and 22. The system interconnect bus 22 enables communication to another communication segment. Alternatively, the system interconnect bus 22 enables communication to another type of communication system that implements other protocols. The communication subsystem 10 may be connected to a file server through either the system interconnect bus 20 or the system interconnect bus 22.

The bus interface circuits 46 and 86 control the interface signals and access protocol to the system interconnect buses 20 and 22. For one embodiment, the interface signals for each system interconnect bus 20 and 22 include 36 data/address signals, 5 interface control signals, 4 arbitration and selection signals, 3 error detection signals and 2 system signals.

The CAM circuit 40 contains an address translation table for the switched hub circuit 18. Each row in the address translation table comprises a serial port number field, a parallel port number field, and an address field. The serial port number field is employed by the communication ports 201-212 and 220 to select one of the VTFs 301-312 and 320 in the DRAM subsystem 16. The parallel port number field is employed by the parallel communication port 220 to select a VTF in another communication segment coupled to the system interconnect bus 22.

The VTFs 301-312 and 320 in the DRAM subsystem 16 are managed by the internal logic of the switched HUB circuit 18 and by the CPU subsystem 12. The VTFs 301-312 and 320 are each cyclic. Each VTF 301-312 and 320 is a logical entity constructed from a list of frame buffers. For one embodiment, each frame buffer accommodates a maximum length Ethernet frame. Each frame buffer in the VTFs 301-312 and 320 includes a frame buffer header. The frame buffer header contains address pointers and flags.

When an incoming communication frame is received by one of the communication ports 201-212 and 220, the destination address of the incoming communication frame is used as an index to the address translation table in the CAM circuit 40. A destination port number that identifies one of the communication ports 201-212 and 220 is read from the address translation table in the CAM circuit 40. The receive DMA circuit in the communication port that receives the incoming communication frame then retrieves a pointer to the next available free frame buffer entry in the VTF that corresponds to the destination port number.

A get_vtf_ptr(i) function is employed to retrieve a pointer to the next free (available) frame buffer in the VTF of communication port number i, where i=1 . . . 12 corresponds to the communication ports 201-212. For one embodiment, the get_vtf_ptr(i) function is performed by the CPU 12. For another embodiment, the get_vtf_ptr(i) function is performed by the control circuit 44 which implements a micro coded micro machine. The CPU 12 or the control circuit 44 performs the get_vtf_ptr(i) function by accessing the control memory block 332 of the communication segment. The control memory block 332 contains a request queue for each of the communication ports 201-212 and 220 that indicates available frame buffers in the corresponding VTFs 301-312 and 320.

The get_vtf_ptr(i) returns a pointer to the next available frame buffer of the VTF number i, where i=1 . . . 12 corresponds to the VTFs 301-312. The receive DMA circuit in the communication port that receives the incoming communication frame then transfers the received communication frame to the destination VTF number i. The receive DMA circuit transfers the received communication frame to the destination VTF number i in blocks equal to the length of the corresponding internal transmit FIFO memory. The receive DMA circuit transfers the received communication frame in an interleaved fashion over the system interconnect bus 20 to allow interleaved transfers by other communication ports. After each time a block the size of the internal transmit FIFO is transferred to the destination VTF number i, the control circuit 44 sets an IFL flag in the frame buffer header.

The transmit DMA circuits in the communication ports 201-212 and 220 access data from the beginning of the corresponding VTFs 301-312 and 320. The transmit DMA circuits in the communication ports 201-212 and 220 do not start data transfer from frame buffers of the corresponding VTFs 301-312 and 320 until the number of bytes in a frame buffer is greater than or equal to the length of the corresponding transmit FIFO memory as indicated by at least one asserted IFL flag in the frame buffer header. The control circuit 44 clears the IFL flag which corresponds to a completed transfer.

The header of each frame buffer in the VTFs 301-312 and 320 includes a receive data transfer completed (RDTC) flag. The RDTC flag indicates that the receive operation on the incoming communication frame is complete and that the data transfer to that frame buffer is completed. The RDTC flag is asserted by the appropriate receive DMA circuit.

The header of each frame buffer in the VTFs 301-312 and 320 includes an internal FIFO length (IFL) field. The number of bits in the IFL field is determined by dividing the maximum frame length by the length of the internal FIFO memories in the communication ports 201-212 and 220. For one embodiment, the IFL field comprises 12 bits for 1518 byte Ethernet flames and 128 byte internal FIFO memories.

Each asserted bit in the IFL field indicates that a number of bytes equal to the internal FIFO length have been stored into the corresponding frame buffer. An IFL bit is also asserted if a complete communication frame shorter than the internal FIFO length has been stored in the corresponding frame buffer.

The IFL field mechanism permits unrestricted arbitration priority schemes for the VTFs 301-312 and 320. If all the VTFs 301-312 and 320 have the same priority and if access to the system interconnect bus 20 is granted in a "round robin" fashion, then only one IFL bit is required in the frame headers. The input bit rate of the receiving serial communication port is substantially equal to the output bit rate of the transmitting serial communication port. In addition, the internal FIFO memories provide a buffer between the input and output streams, thereby precluding an underrun situation in the transmitting communication port.

The switched hub circuit 18 enables multiple inbound communication frame transfers to the same VTF in the DRAM subsystem 16 while avoiding collisions. Each of the VTFs 301-312 and 320 accommodates more than one communication frame. A frame buffer has a fixed length equal to the maximum size communication frame of the specific protocol. For one embodiment, each frame buffer comprises 1520 bytes plus header overhead for an Ethernet communication link.

Alternatively, a pointer mechanism for a linked list structure of the frame buffers in the VTFs 301-312 and 320 may be used to eliminate the requirement for fixed length frame buffers.

For example, assume that the serial communication port(j) receives a frame with a destination of serial communication port(i), where i, j=1 . . . 12 corresponds to the communication ports 201-212. The get_vtf_ptr(i) function is performed and a pointer to the next free frame buffer of the VTF(i) is returned, where i=1 ... 12 corresponds to the VTFs 301–312. The receive DMA circuit of port(j) starts to transfer the incoming frame to the frame buffer specified by the pointer returned by the get_vtf_ptr(i) function. Assume further that before the receive operation of the serial communication port(j) is completed, the serial communication port(k) receives a frame destined for the serial communication port(i). The get_vtf_ptr(i) function is performed again and a pointer to the next free frame buffer of the VTF(i) is returned. The receive DMA circuit for the serial communication port(k) starts to transfer the received frame to the frame buffer specified by the get_vtf_ptr(i) function.

The two data transfer operations to the VTF(i) from the serial communication port(j) and the serial communication port(k) are performed in parallel. The two data transfer operations to the VTF(i) are interleaved over the system interconnect bus 20. Additional data transfer operations for other serial communication ports (1 ... 12) to the VTF(i) may also occur in parallel if the VTF(i) has available frame buffers. In each case, the received data is transferred in to consecutive frame buffers of the VTF(i), according to the order of arrival at the serial communication ports (1 ... 12).

The parallel operation described above for the serial communication ports (1 ... 12) that receive frames destined for the same VTF avoids collisions during transmissions by multiple communication agents to the same communication agent. The transmitting communication agents and the receiving communication agent do not sense delay in the transmission process.

The control memory block 332 contains a VTF_full flag for each of the VTFs 301–312 and 320. Each VTF_full flag indicates the free space status of the corresponding VTF. The VTF_full flag is set if less than one free frame buffer is available in the corresponding VTF. If the VTF_full flag is set, then a received frame destined for the corresponding VTF is not transferred to the corresponding VTF. Instead, the control circuit 44 applies back pressure on the incoming communication link and places a received frame header in the request queue of the corresponding VTF.

The VTF_full flag for a VTF is reset when the corresponding transmit DMA circuit transfers enough data from the VTF to provide at least one free frame buffer. For one embodiment, the VTF_full flags are maintained by the control circuit 44. For another embodiment, the VTF_full flags are maintained by the CPU 12.

If a frame is destined for a VTF having a corresponding VTF_full flag set, then the receiving serial communication port emulates a collision on the incoming communication link. The collision emulation is referred to as applying "back pressure" that maintains the transmitting communication agent in a deferred state until the VTF can accommodate another full communication frame. The incoming communication frame is then transferred to the VTF of the destination serial communication port.

For another embodiment, which allows multiple end-stations to connect to a single switched HUB port, the collision is dropped after the standard JAM time to permit other stations on the communication link to communicate.

The CPU 12 maintains a request queue for each of the VTFs 301–312 and 320. The request queues are located in the control memory block 332. Each request queue is accessible by all switched hub circuits coupled to the system interconnect bus 20, i.e. switched hub circuits on the same communication segment.

Each VTF_full flag in the control memory block 332 indicates the status of the request queue of the corresponding VTF. If a request queue is not empty, then the CPU 12 maintains the corresponding VTF_full flag set. A serial communication port that receives a communication frame destined for a VTF tests the corresponding VTF_full flag. The serial communication port starts transfer of the incoming communication frame to the specified VTF only if the corresponding VTF_full flag is not set. If the corresponding VTF_full flag is set, then the control circuit 44 stores a receive header and the corresponding serial communication port number (1 ... 12) in the request queue of the corresponding VTF.

Each header in the request queue for a VTF functions as a place holder for an incoming communication frame destined for that VTF. The arrival order of the incoming communication frames destined for a communication port is indicated by the ordering of headers in the corresponding request queue. After a VTF_full flag is reset, the CPU 12 notifies the communication port specified by the first header in the request queue that a frame buffer is available in that required VTF. After the transfer of the incoming communication frame to the VTF is initiated, the CPU 12 removes the header from the corresponding request queue.

After a receive DMA circuit transfers an incoming communication frame to a VTF, the CPU 12 removes the corresponding service request from the corresponding request queue. The CPU 12 then initiates the receive DMA circuit of the next communication port specified in the request queue of that VTF to maintain the order of incoming communication frame arrivals to the communication system 10. The last frame buffer in a VTF is referred to as a back pressure buffer.

A receiving communication port seeking to transfer an incoming communication frame to a VTF tests the VTF_full flag of that VTF. If the VTF_full flag is set, then the receiving communication port applies "back pressure" on the incoming communication link. The back pressure places the transmitting communication agent coupled to the communication link in a differed state. The deferred state of the transmitting communication agent is dropped after sufficient space becomes available in the VTF to accommodate the incoming communication frame. For one embodiment, the back pressure is applied only for the permitted Ethernet JAM period.

A VTF_full flag is asserted if less than one frame buffer is available in the corresponding VTF to prevent the possibility of a late collision situation, which may happen if the receive DMA channel finds that no more buffer space is available in the VTF and more than 512 bits have already been transferred. Late collision is not allowed by the Ethernet protocol.

The CPU 12 executes a congestion control process that gathers statistics on the request queues and the available empty space for the VTFs 301–312 and 320. The congestion control process determines the most congested of the VTFs 301–312 and 320. The CPU 12 then modifies the space allocation of the VTFs 301–312 and 320 according to that determination. The congestion control process changes the number of frame buffers available to each of the VTFs 301–312 and 320. The dynamic buffer allocation provided by the congestion control process increases the efficiency of memory usage in the DRAM subsystem 12 and improves the overall performance of the communication system 10.

Consider the following situation. The serial communication port 201 receives a communication frame destined for serial communication port 204. The VTF 304 is full as indicated by the corresponding VTF_full flag. The serial communication port 201 then applies back pressure on the incoming communication link 31 which causes the transmitting communication agent 130 to enter a differed state.

Assume that the VTF 304 remains filled for a long period of time. Assume further that the serial communication port 206 receives a communication frame destined for the serial communication port 201. The incoming communication frame is placed into the VTF 301. However, that communication frame in the VTF 301 is not transmitted to the destination communication agent 130 because the serial communication port 201 is busy applying the JAM pattern in order to prevent the communication agent 130 from transmitting to the serial communication port 204.

Such a phenomenon is not desirable because the performance of the communication system 10 is reduced. In addition, the incoming communication frame through the serial communication port 206 is delayed by unrelated transactions to the serial communication port 204.

The following algorithm provides a solution to the problem. The serial communication port that is busy transmitting JAM pattern, the serial communication port 201, stops the JAM signal, thereby starting a collision resolution process. The contending stations, which are the serial communication port 201 and the communication agent 130, draw numbers beginning from a range of 0,1 and proceeding in powers of 2. After waiting the resulting slot times, the serial communication port 201 and the communication agent 130 try to transmit again.

The control circuit of the serial communication port 201 plays an unfair game in the collision resolution process, and always draws a 0. As more iterations of collision resolution process occur, the winning probability of the communication agent 130 decreases exponentially. Eventually, the serial communication port 201 wins and obtains the right to transmit the pending communication frame (the communication frame originated through serial communication port 206) from the VTF 301 to the communication agent 130. After transmission of the pending communication frame, the serial communication port 201 resumes the JAM transmission, thereby restoring the previous back pressure process.

For broadcast and multicast processing, the broadcast memory structure 330 comprises a collection of frame buffers. Each frame buffer includes a special header which indicates whether the frame buffer corresponds to a broadcast or multicast frame. The special header also contains a destination group field for the destination addresses for the communication frame in the case of multicast frames. The multicast filtering is performed by the CPU 12 using dedicated tables and firmware.

When a broadcast or multicast communication frame arrives, the receive DMA circuit of the receiving serial communication port transfers the communication frame in to the first available frame buffer in the broadcast memory structure 330, and updates the special header of the frame buffer. The CPU 12 manages a "free buffer list" and the related operations for the broadcast memory structure 330.

Whenever a broadcast or multicast communication frame is placed in a free frame buffer in the broadcast memory structure 330, the CPU 12 updates the VTFs of the appropriate destination ports and writes appropriate headers to their VTF frame buffer headers. For a broadcast communication frame, a header is written to each VTF with the exception of the VTF that corresponds to the source of the broadcast communication frame. For a multicast communication frame, a header is written to each VTF in the specified multicast destination group in the special header.

A pointer field in the frame buffer headers in the VTFs 301–312 and 320 points to the beginning of the corresponding frame data areas. For a broadcast or multicast frame, that pointer points to the beginning of the data area of the broadcast or multicast frame in the broadcast memory structure 330. The special broadcast or multicast header is updated by the receive DMA circuit that received the broadcast or multicast communication frame during the transfer to the broadcast memory structure 330.

A Find_Next_Free_BC_buff function finds the next available frame buffer in the broadcast memory structure 330. The free buffer list is managed by the CPU 12 and the pointer of the next available free buffer is placed in a predetermined location accessible by all switched hub circuits in a corresponding communication segment including the switched hub circuit 18.

When one of the serial communication ports 201–212 detects an incoming broadcast or a multicast communication frame, the control circuit 44 retrieves a pointer to the next free frame buffer in the broadcast memory structure 330 with the Find_Next_Free_BC_buff function.

The receive DMA circuit in the receiving communication port writes the header of the broadcast or a multicast communication frame in to the broadcast memory structure 330 and activates a special arbitration signal on the system interconnect bus 20. The special arbitration signal inhibits the serial communication ports 201–212 and the parallel communication port 220 from starting transfers of newly received communication frames into any of the VTFs 301–312 and 320. The ports 201–212 and 220 which are in the middle of transferring a received communication from to any of the VTFs 301–312 and 320 can complete their transfers.

The special arbitration signal causes the CPU 12 to decode the header of the broadcast or a multicast communication frame in the broadcast memory structure 330 and to write appropriate headers in the VTFs of the specified destination ports. The fixed size of the frame buffers in the VTFs 301–312 and 320 enables the CPU 12 to properly place the next frame buffer header in the appropriate VTFs 301–312 and 320 even during a concurrent transfer by one of the ports 201–212 and 220 to one of the VTFs 301–312 and 320. After the CPU 12 completes building the appropriate headers in the specified VTFs for the broadcast or a multicast frame, the special arbitration signal is deasserted to permit regular operation of the ports 201–212 and 220.

A broadcast or a multicast frame buffer in a VTF is treated the same as a frame buffer of a regular communication frame. The data area of the broadcast or a multicast frame buffer is empty, because the header points to the broadcast memory structure 330. When the broadcast or multicast communication frame has been transferred to the internal transmit FIFO of the communication port by the corresponding DMA circuit, then the source frame buffer in the VTF is considered as free.

The management of broadcast or multicast frame buffers requires that all the required transmit DMA circuits complete transfer of the data from the frame buffer in the broadcast memory structure 330 to release the broadcast or a multicast frame buffer.

After each transmit DMA circuit of the serial communication ports 201–212 completes transfer of the data to the corresponding transmit FIFO memories, the control circuit 44 writes a bit to a special field of the broadcast or multicast frame header in the broadcast memory structure 330. The width of that special field is the maximum number of ports allowed on a single communication segment. The CPU 12 polls the special fields and releases the frame buffer if all bits in the special field of frame buffer are set.

Cascading Algorithms

FIG. 8 illustrates a communication subsystem 300. The communication subsystem 300 comprises a CPU 310, a DRAM subsystem 320, and a set of switched hub circuits 330-334. The CPU 310, the DRAM subsystem 320, and the switched hub circuits 330-334 communicate over a system interconnect bus 340. The CPU 310 performs communication management functions for the communication system 300.

The CPU 310 manages a set of virtual transmit FIFOs (VTFs) in the DRAM subsystem 320. The DRAM subsystem 320 contains a VTF for each of the serial communication links 350-354.

The switched hub circuits 330-334 enable communication among communication agents coupled to sets of serial communication links 350-354. The switched hub circuits 330-334 provide serial communication ports for each of the serial communication links 350-354. The switched hub circuits 330-334 enable transfer of incoming and outgoing communication frames between the serial communication links 350-354 and the corresponding VTFs in the DRAM subsystem 320.

FIG. 9 illustrates a communication subsystem 400. The communication subsystem 400 comprises a set of CPUs 410-414, a set of DRAM subsystems 460-464, and a set of switched hub circuits 450-454. The CPU 410, the DRAM subsystem 460, and the switched hub circuit 450 communicate over a system interconnect bus 420. The CPU 412, the DRAM subsystem 462, and the switched hub circuit 452 communicate over a system interconnect bus 422, and the CPU 414, the DRAM subsystem 464, and the switched hub circuit 454 communicate over a system interconnect bus 424.

The CPU 410 manages a set of VTFs in the DRAM subsystem 460 that correspond to the serial communication links 440. The CPU 412 manages a set of VTFs in the DRAM subsystem 462 that correspond to the serial communication links 442, and the CPU 414 manages a set of VTFs in the DRAM subsystem 464 that correspond to the serial communication links 444.

The switched hub circuits 450-454 enable communication among communication agents coupled the serial communication links 440-444. The switched hub circuits 450-454 provide serial communication ports for each of the serial communication links 440-444. The switched hub circuits 450-454 enable transfer of incoming and outgoing communication frames between the serial communication links 440-444 and the corresponding VTFs in the DRAM subsystems 460-464.

The serial communication ports in the switched hub circuit 450 access the VTFs in the DRAM subsystem 462 and the serial communication ports in the switched hub circuit 452 access the VTFs in the DRAM subsystem 460 via the system interconnect bus 422 which is coupled to the parallel communication port of the switched hub circuit 450. The serial communication ports in the switched hub circuit 452 access the VTFs in the DRAM subsystem 464 and the serial communication ports in the switched hub circuit 454 access the VTFs in the DRAM subsystem 462 via the system interconnect bus 424 which is coupled to the parallel communication port of the switched hub circuit 452. The serial communication ports in the switched hub circuit 450 access the VTFs in the DRAM subsystem 464 and the serial communication ports in the switched hub circuit 454 access the VTFs in the DRAM subsystem 460 via the system interconnect buses 422 and 424 through the parallel communication ports of the switched hub circuits 450 and 452.

The communication subsystem 400 enables communication ports in the switched hub circuits 450-454 that reside on different system interconnect buses 420-424 to transfer data over the system interconnect buses 420-424 simultaneously. The parallel transfers by the communication ports in the switched hub circuits 450-454 results in increased performance of the communication subsystem 400.

Figure 10:
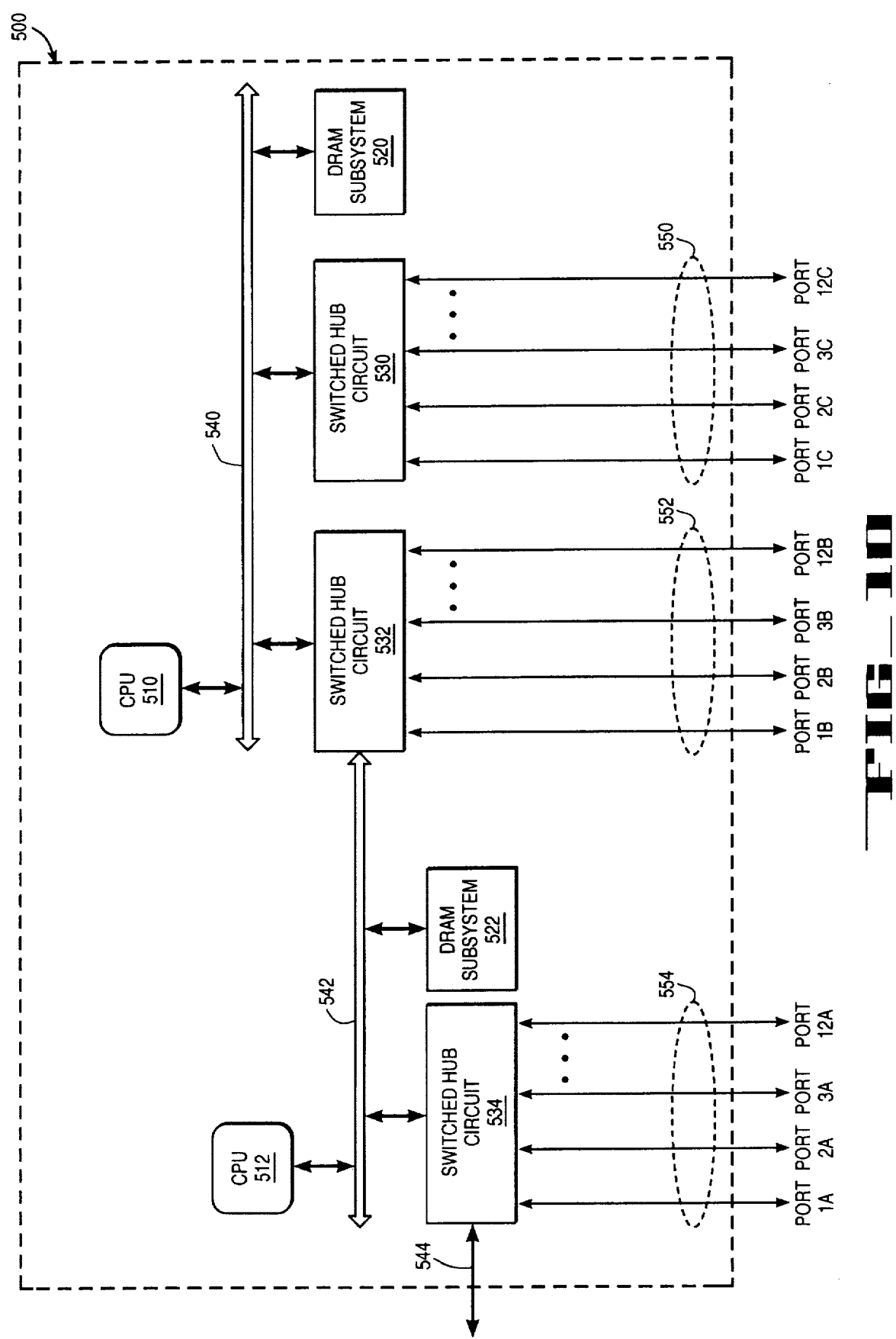
FIG. 10 illustrates a communication subsystem which comprises a pair of CPUs, a corresponding pair of DRAM subsystems, and a set of switched hub circuits.

FIG. 10 illustrates a communication subsystem 500. The communication subsystem 500 comprises a pair of CPUs 510 and 512, a corresponding pair of DRAM subsystems 520 and 522, and a set of switched hub circuits 530-534. The CPU 510, the DRAM subsystem 520, and the switched hub circuits 530-532 communicate over a system interconnect bus 540. The CPU 512, the DRAM subsystem 522, and the switched hub circuit 534 communicate over a system interconnect bus 542.

The CPU 510, the DRAM subsystem 520, the switched hub circuits 530-532 and the system interconnect bus 540 are referred to as communication segment. Similarly, the CPU 512, the DRAM subsystem 522, the switched hub circuit 534 and the system interconnect bus 542 comprise another communication segment.

The CPU 510 manages a set of VTFs in the DRAM subsystem 520 that correspond to sets of serial communication links 550 and 552. The CPU 512 manages a set of VTFs in the DRAM subsystem 522 that correspond to the serial communication links 554. The sets of serial communication links 550-554 each correspond to serial communication ports 1-12 (Port 1 through Port 2) of each corresponding switched hub circuits 530-534.

The Ports 1C-12C of the switched hub circuit 530 and the Ports 1B-12B of the switched hub circuit 532 access the VTFs in the DRAM subsystem 522 via the system interconnect bus 542 which is coupled to the parallel communication port of the switched hub circuit 532. Similarly, the Ports 1A-12A of the switched hub circuit 534 access the VTFs in the DRAM subsystem 520 via the system interconnect bus 540.

The architecture of the communication subsystem 500 provides four possible port-to-port routing schemes for communication frames according to the location of the source and destination communication agents on the Ports 1A-12A, 1B-12B, 1C-12C of the switched hub circuits 530-534. The routing schemes are referred to as routing scheme one through routing scheme four.

FIG. 11 illustrates the routing schemes one and two for one embodiment. For routing scheme one, a communication frame is routed through the same switched hub circuit. For example a communication agent coupled to the Port 1B sends a message to a communication agent coupled to the Port 8B.

At block 400, the Port 1B receives an incoming communication frame. The destination address of the incoming communication frame received at the Port 1B is used as an input to the address translation table in the CAM circuit of the switched hub circuit 532 at block 402. The CAM circuit specifies destination port number as the Port 8B. The control circuit of the Port 1B checks the VTF_full flag of the VTF for Port 8B at decision block 404.

The get_vtf_ptr(i) [i=8B] function that specifies the Port 8B is performed at block 408. The receive DMA circuit of the Port 1B is then initiated with the pointer returned by the get_vtf_ptr(i) function. If the specified VTF is full at decision block 404, then a "service request Port 1B" is stored in the request queue of the VTF for the Port 8B at block 406.

The address comparison process is performed immediately upon receipt of the destination address of the incoming communication frame at the Port 1B. The comparison by the 4 way set associative cache requires only 4 clocks. The get_vtf_ptr(i) function is started at that stage, in parallel with the reception of the incoming frame that continues to fill the internal receive FIFO memory of Port 1B in a parallel and pipelined operation.

If the VTF of port 8B is empty at block 410, then the data transfer from the VTF to the internal transmit FIFO memory of port 8B by the transmit DMA circuit of the Port 8B is started as soon as the receive DMA circuit of the Port 1B completes the transfer of a first "internal FIFO length" of bytes of the incoming communication frame and the corresponding IFL flag is set. The switched hub circuit 532 does not wait until the incoming communication frame is complete to check the CRC for the frame (i.e., a true switching operation).

For routing scheme two, a communication frame is routed through different switched hub circuits on the same communication segment. For example, a communication agent coupled to the Port 1B sends a message to a communication agent coupled to the Port 1C. The Ports 1B and 1C use the DRAM subsystem 520 for data transfers. The Port 1B retrieves the proper destination port number from the address translation table in the CAM circuit of the switched hub circuit 532 as provided at block 402. The destination port number specifies an external communication port on the same communication segment.

Thereafter, the control circuit of the switched hub circuit 532 requests ownership of the system interconnect bus 540. After obtaining ownership through an arbitration process for the system interconnect bus 540, the control circuit of the switched hub circuit 532 tests the VTF_full of the VTF corresponding to the Port 1C.

If the VTF corresponding to the Port 1C is not full at decision block 404, then a get_vtf_ptr(i) function is performed at block 408. The receive DMA circuit of the Port 1B then starts transferring the incoming communication frame to the VTF for the Port 1C at block 410.

If the VTF corresponding to the Port 1C is full at decision block 404, then the control circuit of the switched hub circuit 532 (or alternatively the CPU 510) enters a "Port 1B service request" to the request queue of the VTF for the Port 1C at block 406. After the "Port 1B service request" reaches the beginning of the request queue of the VTF for the Port 1C, the CPU 510 initializes the receive DMA circuit of the Port 1B and the specified data transfer is started. After the incoming communication frame has been fully transferred to the VTF for the Port 3C, the CPU 510 removes the "Port 1B service request" from the request queue for the Port 1C.

FIG. 12 illustrates the routing schemes three and four for one embodiment. For routing scheme three, a communication frame is routed through different switched hub circuits on different communication segments wherein the sending or receiving port is located in the switched hub circuit that couples together the communication segments. For example, a communication agent coupled to the Port 1B send a message to a communication agent coupled to the Port 4A.

FIG. 13 illustrates a row of an address translation table for one embodiment. The first port number field of the address translation table in the CAM circuit of the switched hub circuit 532 contains the destination port number for the received communication frame. The second port number field of the address translation table corresponds to the parallel port of the switched hub circuit 532. The second port number field of the address translation table contains the port number to which the received communication frame is transferred on the communication segment coupled to the parallel port of the switched hub circuit 532.

The Port 1B receives the incoming communication frame at block 430. The Port 1B retrieves the destination port number from the first port number field of a row in the address translation table in the CAM circuit of the switched hub circuit 532 at block 432. The Port 1B retrieves the port number of the parallel port of the switched hub circuit 532 as the destination port number for the incoming communication frame. The Port 1B then transfers the received communication frame to the VTF corresponding the parallel port of the switched hub circuit 532 at block 434 as previously described in blocks 404–410.

After the received communication frame from the Port 1B reaches the beginning of the VTF corresponding the parallel port of the switched hub circuit 532, the transmit DMA circuit of the parallel port of the switched hub circuit 532 transfers the data to the internal transmit FIFO memory of the parallel port of the switched hub circuit 532.

The control circuit of the switched hub circuit 532 then performs a second search of the address translation table, but now on the second port number field at block 436. The control circuit of the switched hub circuit 532 retrieves the port number of the destination port in the communication segment coupled to the parallel port of the switched hub circuit 532 from the second port number field. The control logic of the switched hub circuit 532 retrieves the port number Port 4A. The received communication frame is then transferred to the VTF of the communication Port 4A at block 438 by the receive DMA circuit of the parallel port of the switched hub circuit 532.

For routing scheme four, a communication frame is routed through different switched hub circuits on different communication segments wherein the sending or receiving port is located in a different switched hub circuit than the switched hub circuit that couples together the communication segments. For example, a communication agent coupled to the Port 1C send a message to a communication agent coupled to the Port 4A.

The Port 1C receives the incoming communication frame at block 430 and retrieves the port number of the parallel port of the switched hub circuit 532 at block 432. The control logic of the switched hub circuit 530 transfer the received communication frame into the VTF of the parallel port of the switched hub circuit 532 at block 434. After the received communication frame from the Port 1C arrives at the beginning of the parallel port of the switched hub circuit 532, the control logic of the switched hub circuit 532 transfers the frame buffer to the VTF of the specified destination port, i.e. Port 4A at block 438, the same way as was described in scheme number 3.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A communication subsystem comprising:

a central processing unit (CPU);

a communication segment comprising:
- a switched hub circuit comprising a plurality of serial communication ports, each serial communication port comprising:
  - a transmit first-in-first-out buffer (FIFO);
  - a receive FIFO;
  - a transmit direct memory access (DMA) circuit;
  - a receive DMA circuit; and
  - a communication control circuit;
- a dynamic random access memory (DRAM) subsystem, the DRAM subsystem comprising a plurality of virtual transmit FIFOs (VTFs), each VTF corresponding to a serial communication port of the plurality of serial communication ports, each VTF comprising a plurality of frame buffers; and a system interconnect bus coupling the switched hub circuit, the DRAM subsystem and the CPU.

2. The communication subsystem of claim 1, wherein the switched hub circuit further comprises a control and arbitration circuit coupled to the plurality of serial communication ports, the control and arbitration circuit comprising a content addressable memory (CAM) comprising an address translation table containing destination port addresses of incoming communication frames.

3. The communication subsystem of claim 1, wherein the switched hub circuit further comprises a plurality of parallel communication ports, each parallel communication port comprising a transmit FIFO, a receive FIFO, a plurality of transmit DMA circuits, a plurality of receive DMA circuits, and a bus interface circuit.

4. The communication subsystem of claim 1, wherein the CPU analyzes frame buffer usage in the VTFs and allocates frame buffers among the VTFs accordingly, and wherein the VTF comprises flags indicating the state of VTF fame buffers, the flags being set or reset by the CPU according to the state of the VTF frame buffers.

5. The communication subsystem of claim 1, wherein the DRAM subsystem further comprises a broadcast memory structure which includes broadcast frame buffers and a free buffer list, the free buffer list being managed by the CPU.

6. A communication method comprising the steps of:

(A) receiving a communication frame in a receive first-in-first-out buffer (FIFO) of a source port;

(B) determining a destination port for the communication frame received;

(C) transferring the communication frame received to a virtual transmit FIFO (VTF) corresponding to the destination port using a receive direct memory access (DMA) circuit, the communication frame being stored in frame buffers of the VTF in order of arrival with respect to communication frames from different source ports being sent to the destination port, the communication frame and the communication frames from different source ports being interleaved in the VTF; and (D) transferring a topmost frame buffer of the VTF to a transmit FIFO in the destination port using a transmit DMA circuit.

7. The communication method of claim 6, wherein step (C) further comprises the steps of:

using a destination address of the communication frame as an index to an address translation table in a content addressable memory (CAM);

reading a destination pointer from the address translation table to identify the destination port;

retrieving a pointer to a next free frame buffer in the VTF; and sending the communication frame to the VTF over a system interconnect bus interleaved with the communication frames from different source ports.

8. The communication method of claim 7, further comprising the steps of:

setting an internal FIFO length (IFL) bit in a header of the VTF each time a block the size of the transmit FIFO is transferred to the VTF;

setting a receive data transfer completed (RDTC) flag each time a receive operation on the communication frame is completed, setting a VTF_full flag when there is no free frame buffer in the VTF and placing a header of the communication frame in a request queue of the VTF.

9. The communication method of claim 6, further comprising the step of:

(E) executing a congestion control process on the CPU wherein statistics on VTF usage are gathered and allocation of frame buffers in the VTF are modified accordingly.

10. The communication method of claim 6, further comprising the steps of:

(F) receiving a multicast communication frame having multiple destination ports and placing the multicast communication frame in a frame buffer of a broadcast memory structure;

(G) writing a header to a corresponding VTF of each of the multiple destination ports;

(H) inhibiting transfer of newly received communication frames to the corresponding VTFs until the headers are written the corresponding VTFs.

11. A communication system comprising:

a plurality of communication agents;

a communication subsystem coupled to the plurality of communication agents, the communication subsystem comprising:
- a plurality of central processing unit (CPU) subsystems;
- a plurality of communication segments, a communication segment comprising:
  - a switched hub circuit comprising:
    - a plurality of serial communication ports, each serial communication port comprising a transmit first in first out buffer (FIFO), a receive FIFO, a transmit direct memory access (DMA) circuit, and a receive DMA circuit; and
    - a plurality of parallel communication ports, each parallel communication port comprising a transmit FIFO, a receive FIFO, a plurality of transmit DMAs, a plurality of receive DMAs, and a bus interface circuit;
  - a dynamic random access memory (DRAM) subsystem comprising:
    - a plurality of virtual transmit FIFOs (VTFs), each VTF corresponding to a serial communication port of the plurality of serial communication ports, each VTF comprising a plurality of frame buffers;

a broadcast memory structure; and a control memory block; and a system interconnect bus coupling the plurality of CPU subsystems and the plurality of communication segments.

12. The communication system of claim 11, wherein the broadcast memory structure comprises broadcast frame buffers and a free buffer list, the free buffer list being managed by the CPU.

13. The communication system of claim 11, wherein the switched hub circuit further comprises a control and arbitration circuit comprising a content addressable memory (CAM), the CAM comprising an address translation table.

* * * * *

UNITED STATES PATENT AND TRADEMARK OFFICE
CERTIFICATE OF CORRECTION

PATENT NO.    : 5,546,385
DATED         : August 13, 1995
INVENTOR(S)   : Caspi et al.

It is certified that error appears in the above-identified patent and that said Letters Patent is hereby corrected as shown below:

In column 3 at line 10 delete "FIFO's" and insert --FIFOs--

In column 3 at line 13 delete "of" following "to" and prior to "the"

In column 3 at line 17 delete "circuits" and insert --circuits,--

In column 3 at line 27 delete "the"

In column 3 at line 28 insert --the-- following "through" and prior to "same"

In column 8 at line 32 delete "flames" and insert --frames--

Signed and Sealed this

Tenth Day of December, 1996

Attest:

Attesting Officer

BRUCE LEHMAN

*Commissioner of Patents and Trademarks*